D. P. O'BRIEN.
MACHINE FOR TREATING HIDES, SKINS, AND LEATHER.
APPLICATION FILED FEB. 23, 1909. RENEWED JAN. 26, 1915.

1,150,532.

Patented Aug. 17, 1915.
7 SHEETS—SHEET 5.

Witnesses:
Oscar F. Hill
Edith J. Anderson.

Inventor:
Daniel P. O'Brien
by Chas. F. Randall
Attorney.

D. P. O'BRIEN.
MACHINE FOR TREATING HIDES, SKINS, AND LEATHER.
APPLICATION FILED FEB. 23, 1909. RENEWED JAN. 26, 1915.

1,150,532.

Patented Aug. 17, 1915.
7 SHEETS—SHEET 6.

D. P. O'BRIEN.
MACHINE FOR TREATING HIDES, SKINS, AND LEATHER.
APPLICATION FILED FEB. 23, 1909. RENEWED JAN. 26, 1915.

1,150,532.

Patented Aug. 17, 1915.
7 SHEETS—SHEET 7.

Witnesses:
Oscar F. Hill
Edith A. Wiseman

Inventor:
Daniel P. O'Brien
by Chas. F. Randall
Attorney.

COLUMBIA PLANOGRAPH CO., WASHINGTON, D. C.

UNITED STATES PATENT OFFICE.

DANIEL P. O'BRIEN, OF WOBURN, MASSACHUSETTS, ASSIGNOR TO WOBURN MACHINE COMPANY, OF WOBURN, MASSACHUSETTS, A COPARTNERSHIP COMPRISING THOMAS H. MARRINAN AND DANIEL P. O'BRIEN.

MACHINE FOR TREATING HIDES, SKINS, AND LEATHER.

1,150,532.  Specification of Letters Patent.  Patented Aug. 17, 1915.

Application filed February 23, 1909, Serial No. 479,509. Renewed January 26, 1915. Serial No. 4,541.

*To all whom it may concern:*

Be it known that I, DANIEL P. O'BRIEN, a citizen of the United States, residing at Woburn, in the county of Middlesex, State of Massachusetts, have invented a certain new and useful Improvement in Machines for Treating Hides, Skins, and Leather, of which the following is a specification, reference being had therein to the accompanying drawings.

The invention relates, firstly, to the mechanical arrangements in machines for treating hides, skins, and leather which provide for the opening apart of the acting elements to permit a hide, skin, or side to be thrown into position to be operated upon, and which also provide for closing the said elements together upon the said hide, skin, or side to operate thereon.

The invention includes novel and improved devices for these purposes, characterized in part by yielding elements which accommodate hides, skins, or sides of different thicknesses, and also accommodate variations in the thickness of different portions thereof.

It includes, further, improved means for compensating at will for differences in thickness between the back-portion and the belly-portion of a side of hide or leather.

The invention includes, also, the combination with a bed-roll and a putting-out device coöperating therewith, of a device for embossing, pebbling or graining. Also, novel means for moving an auxiliary roll into and out of working position with relation to a roll or cylinder with which it coöperates. Also, the combination with a bed-roll and a putting-out device coöperating therewith, of a device for oiling-off. Also, improved driving mechanism for the operating shaft of the opening and closing devices.

Embodiments of the different features of the invention are shown in the drawings, in which,—

Having reference to the drawings,—the features of the invention are shown applied to a machine of well-known type in which the essential acting elements comprise a work-roll 1 having its periphery furnished with projecting blades extending helically along the same, to scrape or rub the surface of the hide, skin, or side of hide or leather, which is operated upon, a work-supporting bed-roll 2, and a roll 3 which is termed, ordinarily, a feed-roll. The said elements, as usual, are adapted to be opened apart by relative movement to permit a hide, skin, or side, to be thrown by a workman into position between the bed-roll and the feed-roll and work-roll. When they are closed together, as in Figs. 6 and 9, the hide, skin, or side, it extending between the feed-roll and bed-roll, and down between the latter and the work-roll, is pressed by the periphery of the bed-roll against the edges of the blades of the work-roll, and also against the periphery of the feed-roll. It is backed up by the bed-roll while being acted upon by the said blades, and by the rotation of the bed-roll and feed-roll it is fed so as to present successive portions of its length to the action of the blades. The said three rolls are shown mounted as heretofore. Thus, the shaft 4 of the work-roll is fitted to bearings (one of which is seen at 5 in Fig. 4) supported in fixed position by the side-frames 6, 6, of the machine. The shaft 7 of the feed-roll is fitted to bearings in boxes 8, 8, occupying guide-ways in the said side-frames and pressed downward toward the position of the bed-roll by expanding springs 9, 9, Figs. 3 and 4, the extent of the approach of the feed-roll to the bed-roll being limited by contact of the bearings 8, 8, with the inner arms of levers 10, 10, which are pivotally mounted upon the side-frames and set by means of adjusting-screws 11, 11.

Figure 1:
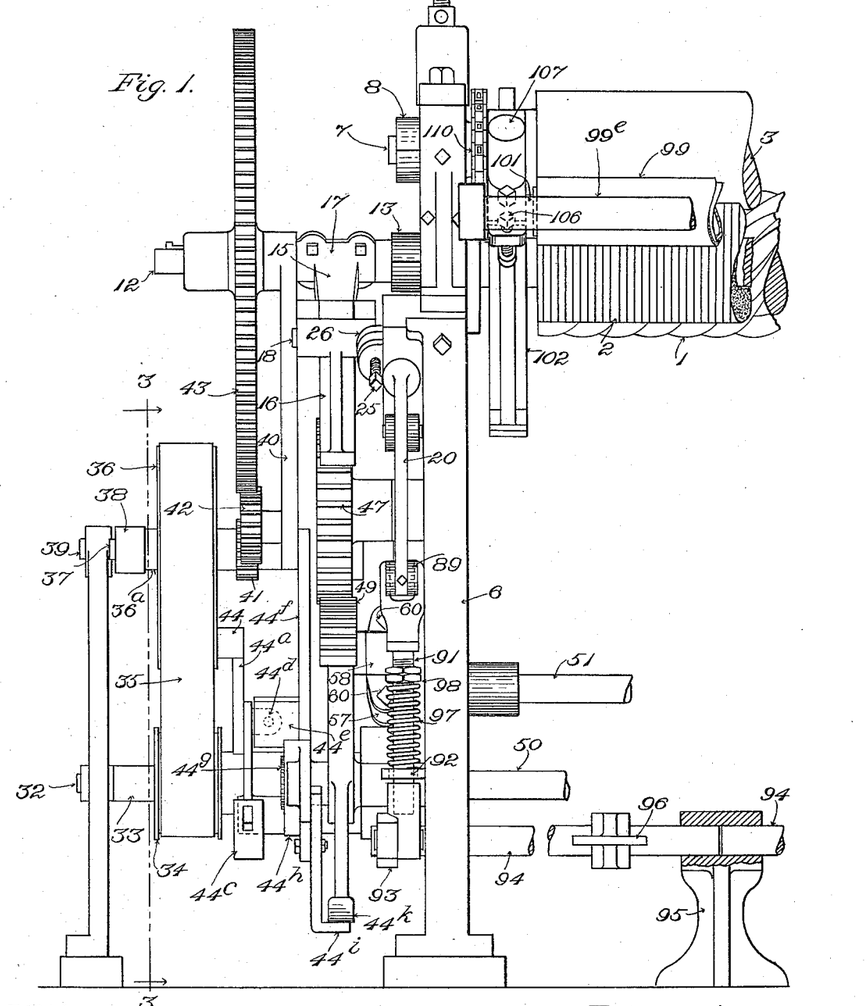
Figure 1 is a front elevation of the left-hand end of a machine containing the said embodiments.
Figure 2:
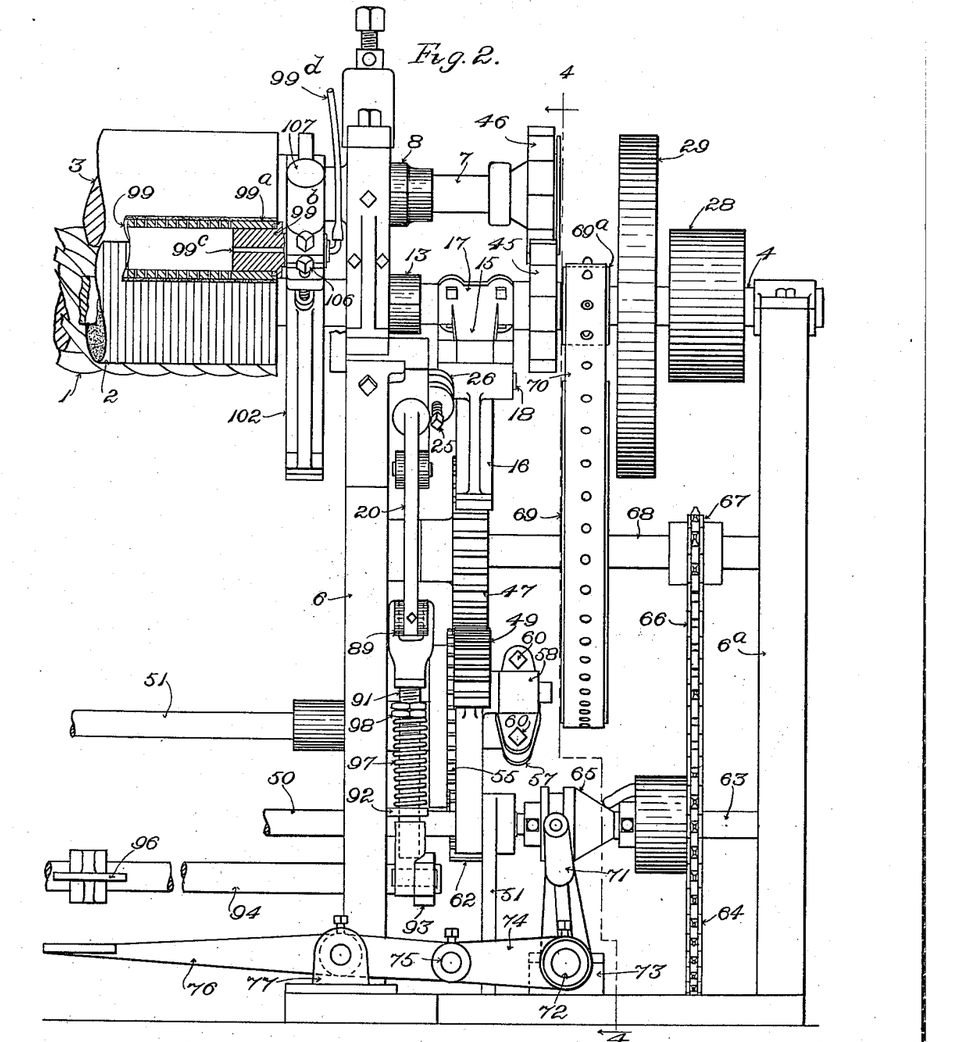
Fig. 2 is a front elevation of the right-hand end of such machine, with the auxiliary roll in longitudinal section.
Figure 3:
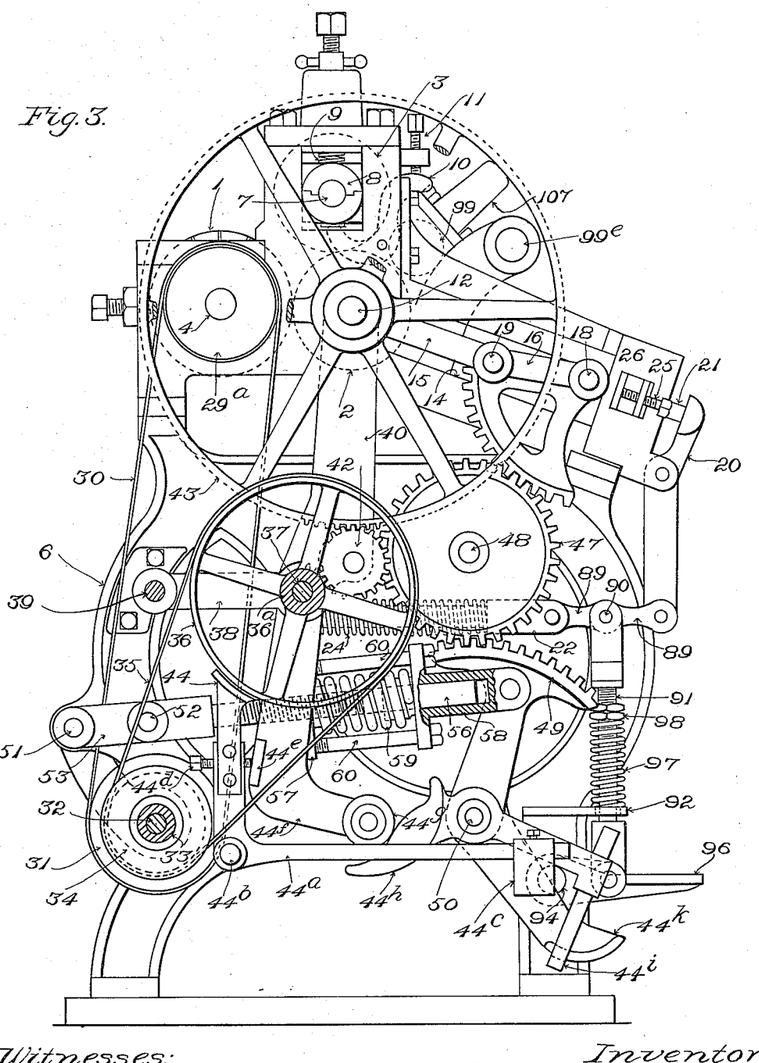
Fig. 3 is an end elevation of the left-hand end of the machine, partly in section on line 3, 3, of Fig. 1, and with portions of certain parts broken away.
Figures 4, 8:
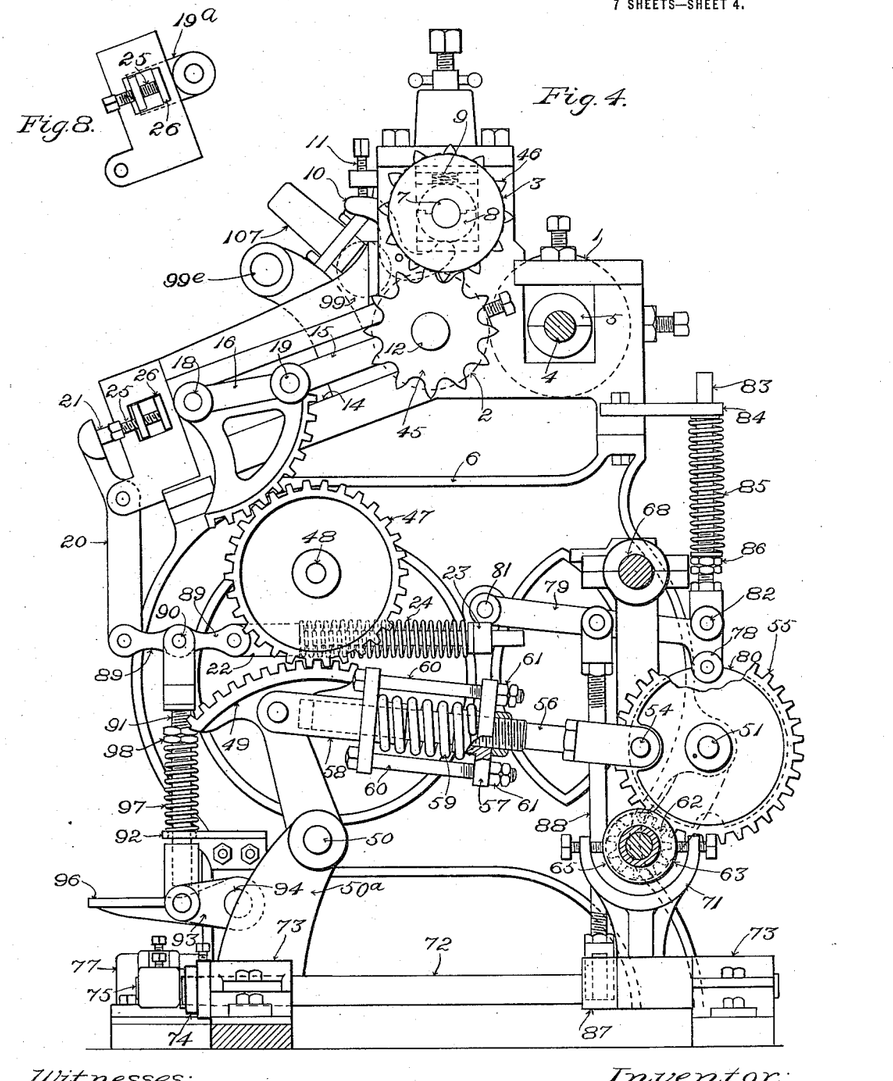
Fig. 4 is an end elevation of the right-hand end of the machine, partly in section on line 4, 4, of Fig. 2, and with portions of certain parts broken away.
Fig. 8 is a detail view on an enlarged scale showing more particularly one of the slides with which the sectors of the toggles are pivotally connected.

The shaft 12 of the bed-roll is fitted to bearings in slides 13, 13, Figs. 1 and 2, adapted to move lengthwise of inclined guideways 14, 14, Figs. 3 and 4, in the side-frames. When the slides 13, 13, are at the outer ends of the said guideways, the bed-roll occupies a position more or less widely separated from the work-roll and feed-roll, as in Figs. 5 and 10, the said acting elements being thereby opened apart. When the bearings 13, 13, are at the inner ends of the guideways the periphery of the bed-roll occupies the angle between the peripheries of the work-roll and feed-roll, the said acting elements being thereby closed together, as in Figs. 6 and 9. The position of the bed-roll is controlled as heretofore by means of toggles and actuating connections for such toggles, a pair of toggles being employed at each side of the machine. Each pair comprises a link 15 and an arm 16, Figs. 1, 2, 5 and 6. The link is furnished at one end thereof with a bearing 17, Figs. 1, 2, 5 and 6, which fits the shaft 12 of the bed-roll next the corresponding slide 13, at the outer side of the latter. The arm is mounted upon a supporting pivot at 18. The link and arm are joined together by an intermediate pivot at 19. The means of operating the toggles will presently be described in explaining the features of the invention. When the arm is moved so as to straighten the toggle, the action of the latter will push the bed-roll into the angle between the work-roll and feed-roll, and so long as the toggle is kept straight, or approximately straight, the bed-roll will be held there, pressing against the work-roll and feed-roll. When the toggle is caused or allowed to break, i. e., bend, the bed-roll will thereby be caused or allowed to open away from the other two rolls. Provision is made for permitting the bed-roll to accommodate itself, in being closed, to the thickness of the hide, skin, or side between its periphery and the peripheries of the work-roll and feed-rolls, and, while in its closed position, to variations or unevenness in such thickness, by mounting the pivot 18 upon a movable sliding support 19ª, Fig. 8, and providing a yielding backing for such support. Such backing comprises a lever 20, Figs. 1 to 4, pivoted upon the corresponding side-frame of the machine, with one arm thereof engaging with a pin 21 extending forwardly in front of the sliding support, the other arm of such lever being linked to a rod 22 working through a guide 23, Fig. 4, carried by the said side-frame, the said rod being surrounded by an expanding spring 24 that is confined between guide 23 and a shoulder on the rod. The tendency of the said spring to expand operates through the rod, links, and lever to hold the sliding support 19ª pressed rearward, the extent of the movement rearward being limited through the engagement of a set-screw 25, which is carried by the said support, with a fixed stop-lug 26 on the side-frame.

Figure 7:
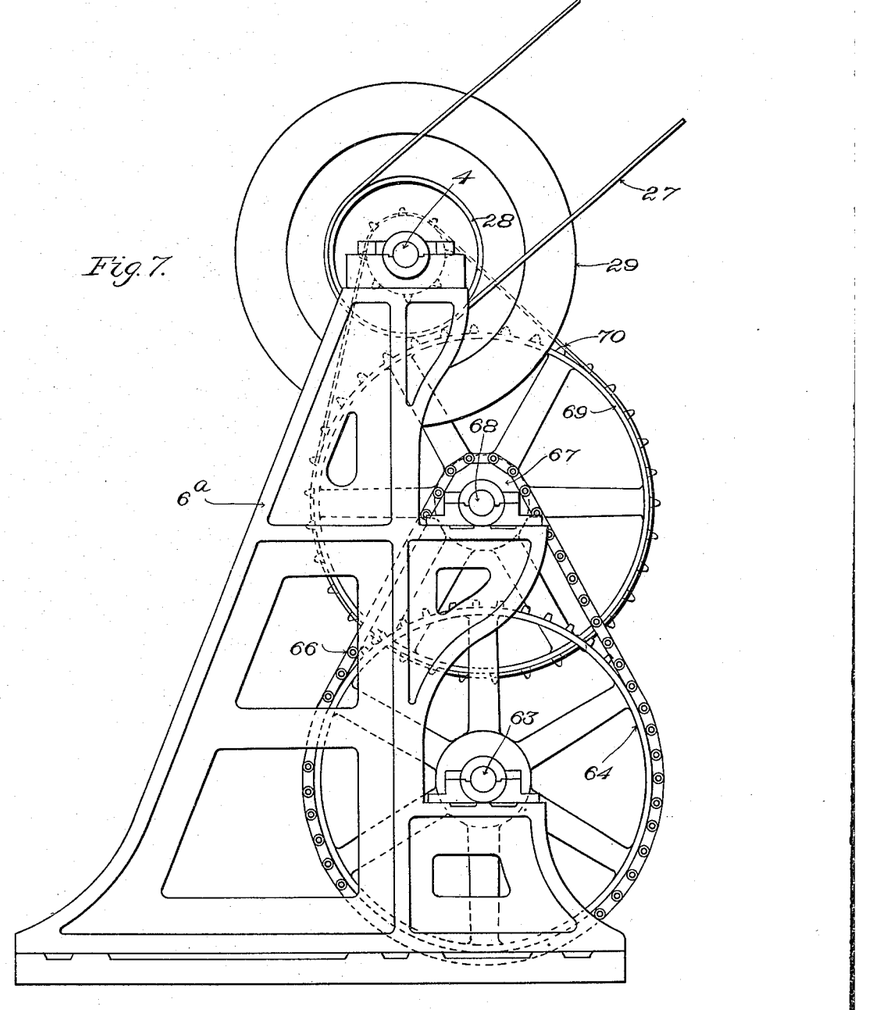
Fig. 7 is an end elevation of the driving connections at the right-hand end of the machine, showing the parts which are omitted from Fig. 4.

The roll-driving arrangements shown in the drawings are essentially the same as those heretofore employed. The work-roll is rotated by the application of driving-power through a driving-band 27, Fig. 7, to a band-pulley 28, Figs. 2 and 7, fixed upon the shaft 4 of such roll at the right-hand side of the machine, a fly-wheel 29 being also fixed upon the said shaft. For the purpose of transmitting motion from the work-roll to the bed-roll, a band-pulley 29ª, Fig. 3, is fixed upon shaft 4 at the left-hand end of the machine. A driving-band 30 passes around such band-pulley and also around a band-pulley 31 turning loosely upon a fixed stud 32 in the lower part of the machine and having fixed upon its sleeve 33 a second band-pulley 34. By means of such band 30 rotary motion is communicated to the pulleys 31 and 34. A driving-band 35 passes around the pulley 34 and around a band-pulley 36 fixed on a sleeve 36ª mounted on a stud 37. The said stud is supported by the forward ends of radius-arms 38, 38, which are hung by their rear arms upon a stud 39 projecting out from the machine-frame. A radius-arm 40 hung by its upper end upon the shaft 12 of the bed-roll is engaged by its lower end with the stud 37. A spur-pinion 41, Fig. 1, fixed upon the sleeve 36ª meshes with a spur-pinion 42 that is journaled upon radius-arm 40, and pinion 42 in turn meshes with a spur-gear 43 fixed on shaft 12. The spur-gearing is for the purpose of transmitting rotary motion to the bed-roll when pulley 36 is rotated. Such pulley is not rotated when the rolls are separated, because when the bed-roll occupies its forward position, as in Fig. 5, the radius-arm 40 holds the stud 37 and band-pulley 36 depressed sufficiently to slacken the driving-band 35, and at such time, also, the band-pulley 36 is acted upon by the brake 44, which holds it from turning.

Figures 5, 6:
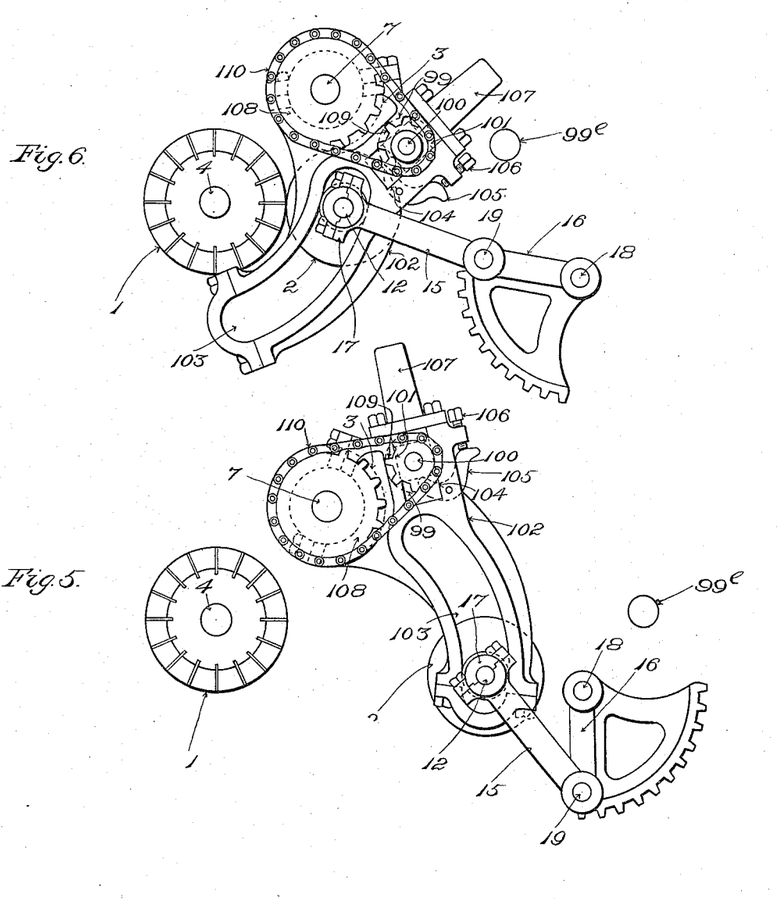
Fig. 5 is a detail view in end elevation looking at the left-hand end of the machine, showing the rolls and the means of supporting and driving the auxiliary roll, and moving it into and out of working relations with the work-support or bed roll. In this view the rolls are opened apart.
Fig. 6 is a view of the parts of Fig. 5, showing the rolls closed together in working relations with one another.

When, however, the bed-roll occupies the position in which it is shown in Fig. 6, namely, closed against the work-roll and feed-roll, the radius-arm 40 and pulley 36 occupy a higher position which tightens the band 35 upon such pulley, and as at this time the brake 44 is disengaged through the action of means presently to be mentioned the pulley 36 is rotated and rotary motion communicated therefrom to the bed-roll. Rotary motion is transmitted from the bed-roll to the feed-roll, when the rolls are closed together, by means of the usual pinions 45 and 46 on the shafts 12 and 7, respectively. When the rolls are closed together the said pinions mesh with each other. When the bed-roll is moved forward, the pinion 45 is taken out of mesh with pinion 46, thereby interrupting the transmission of driving-power to the feed-roll until the bed-roll is moved rearward into its closed position again and the pinions are caused to intermesh with each other again.

As thus far described in detail the construction and operation are as heretofore, and they are set forth herein only in order to render clear the relations and purposes of the different features of the invention.

Various mechanical contrivances have been proposed or employed heretofore for actuating toggles on the order of those above described, or the parts used in lieu thereof, for the purpose of shifting the bed-roll or other movable element or elements. I have contrived the illustrated construction and arrangement of parts, in which each arm 16 is provided with a curved series of teeth constituting of it a toothed sector, and a spur-pinion 47 is suitably journaled at 48 upon the corresponding side-frame 6, with its teeth in mesh with those of arm 16 and also with those of a second toothed sector 49. The toothed sectors 49, 49, at the opposite sides of the machine are shown conveniently mounted upon a cross-shaft 50, which is supported in bearings in connection with the side-frames 6, 6, and with a small stand 50ª, Figs. 2 and 4, at the right hand side of the machine. Swinging movement imparted to sectors 49, 49, is transmitted by the intermediate pinions 47, 47, to the sector-arms 16, 16, thereby operating the latter and thus the toggles. For the purpose of imparting the said movement to sectors 49, 49, they are operatively combined with actuators which may be brought into action at the will of the operator. I prefer to employ actuators which act positively in both directions of movement, and to interpose between them and the said sectors connectors which are made yielding to accommodate any considerable increased thickness between the rolls. In the drawings the positive actuators are constituted by cranks which are fixedly mounted upon a cross-shaft 51. At the left-hand side of the machine, shown in Fig. 3, the crank comprises a crank-pin 52 carried by a crank-arm 53 fixed upon the corresponding end of shaft 51. At the right-hand side of the machine, shown in Fig. 4, the crank comprises a crank-pin 54 carried by a spur-gear 55 fixed upon the corresponding end of the shaft. The connectors between the sectors 49, 49, and the actuator-cranks comprise, respectively, in the form shown in the drawings, a rod 56 connected pivotally with the corresponding crank-pin, the intermediate portion of the length of said rod being screw-threaded, a flanged collar 57 having an internal screw-thread and screwed upon the said portion of the said rod, a flanged member 58 pivotally connected with the sector 49 and having a longitudinal socket which receives the plain forward portion of the rod, and in which such portion is adapted to slide, an expanding spring 59 confined between the collar 57 and the rear end of the member 58, and bolts 60, 60, fitted to holes through the flanges of the said collar and member. The extension of the connector by the tendency of the spring 59 to expand is limited by engagement of the said flanges with the heads of such bolts and with nuts 61, 61, upon the threaded stems of the latter. The spring 59 is quite strong, so that it is compressed very little by the resistance experienced in closing the bed-roll into place. Spring 24 in connection with the abutment-lever 20, being a weaker spring, yields first to accommodate the thickness of material between the acting elements, until any play or backlash among the intermeshing teeth of sector-arm 16, pinion 47, and sector 49, is taken up. Any excess of thickness operating with a tendency to force the bed-roll back still farther will operate through the said sector-arm 16, pinion 47, and sector 49, to compress the spring 59. This action may take place at either or both sides of the machine. To render the parts at one end of the bed-roll independent of those at the other end thereof in their power of accommodation, the sectors 49, 49, are loose upon shaft 50, or one is loose thereon, and the other fixed thereon. This independence permits the bed-roll to accommodate itself to a difference in thickness between the portion of side or skin at one end of the bed-roll and that at the other end thereof.

For use in operating upon light-weight hides, or leather that has been split to a uniform thickness, the springs 24, 24, will in some cases be found sufficient without the springs 59, 59, but when the lot operated upon consists of or includes heavy hides or sides, and especially such as vary considerably in thickness in their different portions, the latter springs are required. They are required in working upon bull-hides and the hides of heavy steers. A bull-hide, for example, is heavy all over, but the neck-portion is thicker in proportion than the neck-portion of a cow-hide.

The actuator-cranks are actuated at the will of the operator by means of power-connections including a manually-controlled clutch. A spur-pinion 62, Figs. 2 and 4, in engagement with the spur-gear 55 on the actuator-shaft 51, forms an element of the said power-connections. The said pinion is fixed on a shaft 63 which is supported in bearings carried by the adjacent side-frame 6 and a supplemental frame or stand 6ª, Figs. 2 and 7. On said shaft is mounted a loose sprocket-wheel 64 adapted to be clutched to the shaft, a movable clutch-cone being shown at 65, Fig. 2. A sprocket-chain 66 passes around the sprocket-wheel 64 and a smaller sprocket-wheel 67 fixed on an intermediate shaft 68 supported by bearings in the stand 6ª and adjacent side-frame. Also fixed on shaft 68 is a large wheel or pulley 69, Figs. 2 and 7, having a series of radial projecting pins at its periphery, and around such pulley and a smaller similar pulley 69ª fixed on the shaft 4 extends a driving-band 70 formed with a series of holes which are entered by the pins of the pulleys 69 and 70. The band 70 transmits motion at a reduced rate from shaft 4 to intermediate shaft 68, and sprocket-chain 66 transmits motion at a still further reduced rate from the said intermediate shaft to the shaft 63. Thereby motion is transmitted positively from the rapidly-rotating driving-shaft 4 to the shaft 63 with the very considerable reduction in velocity that is necessary, without the employment of gearing. The noise, wear and tear, and absorption of power, which are incident to the use of gearing are obviated. Two sprocket-chains and corresponding sprocket-wheels may be employed in cases where the speed of the driving-shaft 4 is not so great as to render the use of a sprocket-chain between the same and the intermediate shaft unsafe, or two perforated driving-bands and corresponding pulleys with pins may be employed.

It will be understood that the shaft 63 requires to rotate at a comparatively low rate of speed, while the speed of rotation of the shaft 4 and work-roll 1 is necessarily quite high. For the purpose of manually controlling the clutch, the clutch-cone 65 is engaged by the fork 71, Figs. 2 and 4, carried by the shipper rockshaft 72 extending from front to rear at the base of the machine and mounted in bearings 73, 73, the said rockshaft having fixed upon its front end an arm 74 extending toward the middle of the machine and engaged by a pin 75, Fig. 2, carried by one arm of a treadle-lever 76 which is supported by a pivotal bearing at 77. The said treadle-lever extends toward the middle of the length of the machine. Pressure thereon operates to clutch the rotating sprocket-wheel 64 to the shaft 63 to cause the latter to be rotated so as to transmit rotary motion to the actuator-cranks through the gearing 62, 55.

The actuator-cranks normally occupy either a position corresponding with the open condition of the rolls, or one corresponding with the closed condition thereof, such positions corresponding with the extremes of throw of the cranks. They are locked in the respective positions by means of a locking roll 78, Fig. 4, mounted on a movable carrier 79 and adapted to occupy either of two opposite concavities or notches in the periphery of a locking wheel 80 fixed on the shaft 51. Carrier 79 is shown pivoted to one of the side-frames 6 at 81, and having connected pivotally thereto at 82 the foot of a rod 83 which passes at its upper end through a hole in a guide 84 fixed to the said side-frame 6. An expanding spring 85 surrounds the stem of the rod and is confined between the said guide and a nut 86 screwed upon a threaded portion of such stem. By the tension of the said spring the carrier 79 is borne toward the periphery of the locking disk, and the locking roll is caused to press against the said periphery and to enter and remain in the notch which is presented to the roll. Thereby the shaft 51 is locked from turning accidentally. When treadle 76 is depressed, so as to clutch sprocket-wheel 64 to shaft 63, an arm 87, Fig. 4, fixed on rockshaft 72, is swung upward so as, through a rod 88 connecting said arm 87 with carrier 79, to raise the said carrier and lift roll 78 out of the notch occupied by it, thereby unlocking shaft 51 so as to leave it free to be turned. As soon as the notch has been caused by the rotation of the said shaft to pass out of line with the roll 78 the pressure of the workman's foot upon treadle 76 may be relieved, and in consequence of the roll being supported by the periphery of the locking disk between notches the clutch will be held closed and the motion of the shaft 51 and actuator-cranks will be continued until the opposite notch is carried around to the roll 78. As soon as the said opposite notch is presented to the roll, the spring 85 will act to move the roll into the notch, locking the shaft 51 so as to arrest its turning movement, and at the same time the downward movement of carrier 79 will act through rod 88 and arm 87 to turn the shipper rockshaft 72 reversely, opening the clutch and disconnecting the sprocket-wheel 64 from the shaft 63, thereby discontinuing the application of driving power to the shaft 51 and its actuator-cranks.

While I prefer to employ actuator-cranks such as shown, the character of the actuators may vary in the case of some embodiments of the different features of the invention. So, also, in some instances the actuators need be positive in one direction only, namely that for closing the acting elements together upon a hide or skin.

The brake 44, Figs. 1 and 3, previously mentioned as acting against the periphery of band-pulley 36, is carried by a lever 44$^a$, supported pivotally at 44$^b$ upon the side-frame 6 at the left-hand side of the machine, and having a forwardly-extending horizontal arm carrying a weight 44$^c$, tending to turn the lever so as to hold the brake in contact with the face of the pulley. When the bed-roll occupies its closed position, shown in Figs. 3, 4 and 6, the brake is held out of contact with the said face, permitting the band-pulley to be rotated by the action of the driving-band 35 so as to cause the bed-roll and feed-roll to rotate. It is thus held through the engagement of a set-screw 44$^d$, carried by the brake-lever, with a lug 44$^e$ projecting from an arm 44$^f$ swinging from stud 37. This arm is actuated at the proper time to cause said lug to press rearwardly against one end of the said set-screw, so as to move the brake-lever in opposition to the weight 44$^c$. To enable the arm to be actuated, it is furnished with a roll 44$^g$, and a cam-lever 44$^h$ is mounted loosely upon shaft 50. The rear arm of the said cam-lever has a cam-face which engages the said roll, and the forward arm thereof has a transverse projection 44$^i$, Fig. 1, adapted to be engaged by an arm 44$^k$. The arm 44$^k$ is connected with shaft 50, or the adjacent sector 49, so that when such shaft or sector is rocked forwardly in the operation of closing the bed-roll rearwardly against the other rolls the arm 44$^k$ acts against the projection 44$^i$ to rock the cam-lever 44$^h$ and thereby causes its cam-face to move roll 44$^g$ and arm 44$^f$ in the direction to operate the brake-lever to disengage the brake from the face of the band-pulley 36. When the parts are operated to cause or permit the bed-roll to open away from the other rolls, the reverse swinging movement of arm 44$^k$ permits the cam-lever, arm 44$^f$, and brake-lever to swing in the direction to enable the brake to again engage with the band-pulley.

Compensation for the difference in thickness between the back-portion of a side and the belly-portion thereof is provided for, in conformity with the invention, by means of devices which enable the workman to vary at will, at the respective ends of the rolls, the effective degree of the spring-pressure by which the active elements are held together with the hide between them. This portion of the invention may be variously embodied in practice, without involving a departure from the broad principles thereof. I have shown a form of embodiment in which each of the abutment levers 20 has the power-arm thereof connected to the corresponding rod 22 by means of an intermediate pair of links 89, 89, forming a toggle, one of said links having one end thereof pivoted to the said power-arm and the other link having an end thereof pivoted to the said rod, while the meeting ends of the links are joined together by a pivot 90. With this pivot is engaged the head-piece of a post 91, the stem of such post passing through a hole in a guide 92 fixed to the machine framework, and the foot of the post being connected pivotally with an arm 93 fixed on a rock-shaft 94, the latter being supported in bearings on the corresponding side-frame 6, and in an intermediate stand 95, Fig. 1. The said stand serves for the support of the inner ends of both rockshafts 94, 94, as shown in Fig. 1. Upon each rockshaft is fixed a treadle 96, Figs. 1 and 2, the two treadles 96, 96, being sufficiently near together at the middle of the width of the machine to enable a workman to press upon either thereof conveniently. The stem of each post 91 is inclosed by an expanding spring 97 which is confined between the corresponding guide 92 and a nut 98 on the said stem, which latter is threaded for the reception of the said nut and to permit the latter to be turned up or down to adjust the tension of the spring. The spring acts with a tendency to keep the post elevated in such position that the toggle 89, 90, 89, shall extend straight and at full length between the abutment lever 20 and the rod 22; thereby bringing the full tension of the spring 24 into play, and employing the full effective pressure at the corresponding end of the bed-roll when the latter is closed against the work-roll and feed-roll with a hide interposed. When, however, the treadle 96 is pressed down, drawing down the post 91, the joint at 90 is depressed, breaking or bending the toggle, so that the tension of the spring 24 is no longer exerted with full force and effect through lever 20. Thereby the effective pressure transmitted from the said spring to the corresponding end of the bed-roll is diminished, the diminution being due to a reduction in the effective length of the connections between the lever and rod. Post 91 is free to swing in the direction from front to rear upon the pivot connecting it with arm 93, the hole in guide 92 through which the post passes being elongated.

The devices just described are combined with the fulcrum and backing at each side of the machine so that, at will, the fulcrum or abutment of the toggle at either side may be allowed to recede so as to permit the acting elements at such side to separate farther than they separate at the opposite side. It is of course well known that as a preliminary to treatment, hides are divided lengthwise into "sides" by a cut along the line of the backbone. When either "side" is introduced into the machine, the back-portion, it having the greater thickness, will be at one side of the machine, and the belly-portion, which is thinner, will be at the other side thereof. To accommodate the thickness of the back, the treadle 96 pertaining to the former side of the machine will be pressed upon, so as to render the acting elements free to separate more at that side to compensate for such thickness. The said "side" having been acted upon from about the middle of its length to one end thereof, it is discharged from the machine. When the pressure upon the treadle 96 is relieved, the spring 97 raises the post 91, straightening out the toggle-connection at 89, 90, 89, and restoring the pressure of the spring 24 to its full effectiveness. The side having been turned end for end, it is re-introduced, being then treated from mid-length to the other end. As re-introduced, the back is now at the side of the machine opposite that at which it was located before. Consequently, the operator now presses down the other treadle 96.

When the compensating devices which have just been described are employed in a machine adapted for fleshing hides, they enable the workman, when he sees that the blades of the work-roll are cutting too much from the back-portion of a side of a hide, to allow the bed-roll to drop back at the corresponding end thereof. When they are employed in a machine adapted for putting-out, they are useful in operating upon "splits", i. e., the flesh portions of sides of leather which have been split into two thicknesses. Splits are uneven in thickness and coarse in texture. The portion of a split which lies over the hip-bone of the animal is very easily caused to bag after the grain part of the leather has been removed, and consequently in putting-out a split it is essential to ease up on the pressure in working upon the hip-portion, in order not to cause it to bag. The compensating devices enable this to be accomplished.

An auxiliary roll, designed to act upon the hide, skin, or side, in front of the bite or nip of the bed-roll 2 and feed-roll 3, is shown at 99. It is desired that this auxiliary roll, when the acting elements are closed together upon a hide, skin, or side shall occupy a position in close proximity to the bed-roll, as shown in Figs. 1, 2, 3, 4, 6 and 9, in order that it may act upon the portion of hide or skin extending from the said bite or nip forward toward the operator. It is also desired that when the said elements are opened apart as in Figs. 5 and 10, the auxiliary roll shall be raised so as to leave a clear and unobstructed opening at the rear of the bed-roll, into and through which that portion of the hide, skin or side which is to be introduced between the acting elements may be thrown, over the bed-roll, so as to fall behind the latter. To this end, I mount the shaft 100 of the said auxiliary roll in bearings 101 which are received in guideways in carriers 102, 102. These carriers are hung upon the journals of the feed-roll 3, or upon cylindrical portions of the boxes 8, 8, for the said journals, and are capable of being swung thereon. To swing them automatically in the required direction at the required time in the working of the machine, the carriers 102, 102, have formed therein cam-slots 103, 103, Figs. 5 and 6, which are occupied by the journals of the bed-roll, or by portions of the boxes 17, 17, for the said journals. Let it be assumed that the bed-roll is in its forward position shown in Fig. 5. The engagement of its journals, or the boxes therefor, with the walls of the cam-slots in the carriers operates to hold the carriers in the positions which keep the auxiliary roll elevated out of the way, thereby leaving the space above and at the rear of the bed-roll clear and open for the introduction of the hide, skin or side. After the latter has been thrown by the workman over the bed-roll so as to hang down at the rear of the bed-roll the action of the journals or boxes of the bed-roll against the walls of the cam-slots 103, 103, when the bed-roll is caused to move toward the work-roll and feed-roll will cause the carriers to swing so as to move the auxiliary roll from its retracted position shown in Fig. 5 to its working position shown in Fig. 6. To enable the relations of the auxiliary roll, in its working position, to the bed-roll to be adjusted carefully, the carriers are formed with guide-ways 104 receiving the boxes 101 of the auxiliary roll, and upon each carrier is pivoted an adjusting lever 105 acted upon by a set-screw 106 applied to the carrier, the corresponding box 101 being pressed with yielding force toward the bed-roll, and thereby held in engagement with the toe of the said adjusting lever, by an expanding spring (not necessary to be shown) of usual character, contained in the casing 107 on the cap-piece or cover of the guideway 104. By properly setting the adjusting devices described the auxiliary roll may be caused to press firmly against the bed-roll, as for instance when the auxiliary roll is employed as a pinch or secondary feed-roll, which I contemplate in some cases. Or the adjusting devices may be so set as to prevent the auxiliary roll from actually making contact with the bed-roll, and the closeness of approach may be varied to suit different requirements in practice. The auxiliary roll is caused to rotate in unison with the other rolls by positive driving devices connecting it with the feed-roll and comprising a sprocket-wheel 108 fixed on one journal of the feed-roll, a sprocket-wheel 109 fixed on the corresponding journal of the auxiliary roll, and a sprocket-chain 110 passing around and engaging the said two sprocket-wheels.

Figure 9:
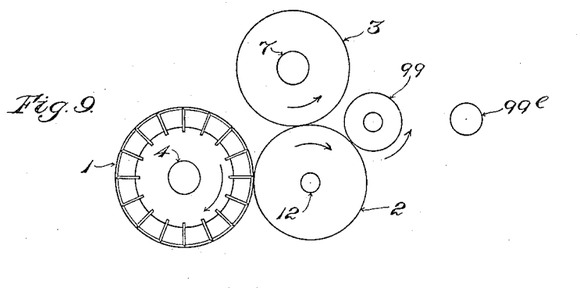
Fig. 9 is a diagram showing the relations of the rolls when closed together.
Figure 10:
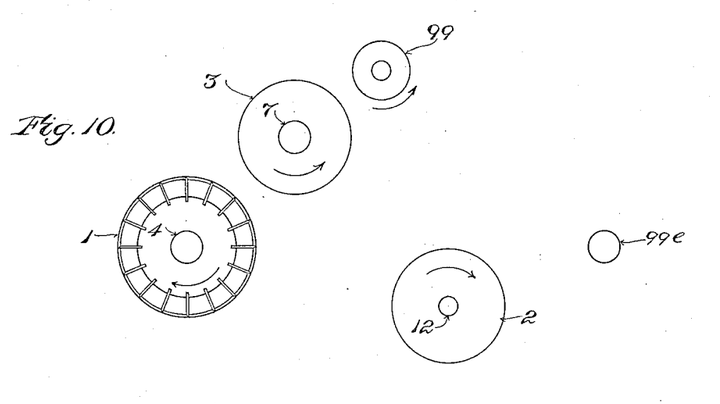
Fig. 10 is a diagram showing the relations of the rolls when opened apart from one another.

The machine constructed as thus far described may be employed for performing the operations of fleshing and unhairing hides or skins, either with or without the auxiliary roll and its movable carriers. I have, however, also particularly contemplated the employment of the machine for putting-out. When it is intended for this latter employment, the blades of the work-roll are made of composition (brass or the like) and their edges are beveled off in front as shown in Figs. 9 and 10 so that they shall act to smooth out the wrinkles and crimps in a hide or skin without cutting or scraping the latter. A putting-out machine constructed with a rotating bed-roll and a feed-roll and work-roll coöperating therewith has marked advantages over machines of the roll and table construction heretofore in use, which are the only kind of machines I have known to be employed for the purpose in actual practice. With the former machine, all portions of a hide, skin, or side may be acted upon uniformly, including the shanks, and the latter will be left free from crimps. With the roll and table machine, on the other hand, the portion of the hide, skin, or side which bends around the edge of the table is left unacted upon, and crimps are put into the shanks, necessitating the employment of a second machine, known as a shanking machine, to remove such crimps. My machine is operated by one man; the other machine referred to requires two or three men, according to the size of the hide, skin, or leather.

Figure 11:
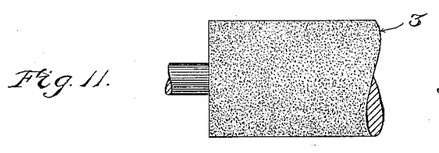
Fig. 11 is a front elevation of a portion of the length of the feed-roll 3, showing its periphery prepared to produce a pebbled effect upon the grain side of leather operated upon in the machine.
Figure 12:
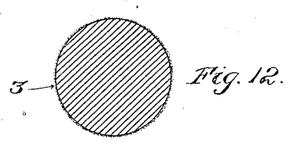
Fig. 12 is a cross-section thereof.

A feature of the invention which is of importance in the case of a putting-out machine is the embossing, pebbling, or graining device which I provide. For convenience in embodying this feature, I utilize the feed-roll 3 for the purpose, by providing it with a peripheral surface which is engraved or otherwise properly prepared to produce the required effect upon the grain side of the leather as represented in Figs. 11 and 12. The embossing, pebbling, or graining operation is very advantageously performed in the machine aforesaid, because the putting-out operation usually is performed upon freshly-tanned leather while the skins or sides are still moist and warm. In this state they readily take the embossed, pebbled, or grained effect, and retain the latter. The work-roll, which in this case is the putting-out roll, acts first upon a skin or side undergoing treatment in the machine, after which the embossing, pebbling, or graining roll acts upon the smoothed and extended surface of the skin or side.

Another feature of the invention which is of especial importance is the oiling-off device. This may be variously constructed and applied. In the illustrated machine, though not necessarily in all instances, the auxiliary roll 99 is constructed to be employed as such device. To fit the roll 99 to be thus employed, it is constructed, as shown best in Figs. 1 and 2, with a hollow body or shell that is perforated for the passage of the oil outward from the interior, and with a jacket 99ª of felt or other absorbent material. To admit the oil to the said interior, one end of the shell is arranged to turn upon a fixed journal 99ᵇ that is formed with a longitudinal passage 99ᶜ therethrough, and has connected therewith an oil-supply pipe 99ᵈ leading to the said passage from an oil-reservoir (not shown). The oil is fed through the said pipe into the roll, and passing outward through the perforations of the body or shell permeates the jacket, and, by the contact of the jacket with the side or skin as the latter is moved forward from between the feed-roll and bed-roll, the oil is applied evenly and uniformly to all portions of the surface of the side or skin.

The employment of an oiling-off device as an element of a putting-out machine enables the oiling-off operation to be performed concurrently with the putting-out operation. One handling of the leather, necessary heretofore, is obviated, and consequently the services of one workman heretofore required for the performance of the separate operation of oiling-off are rendered unnecessary. The oiling-off is performed while the sides or skins are still warm, just as they arrive at the putting-out machine, and while they are in the best condition for absorbing the oil and securing the best results. The oiling-off device applies the oil uniformly to all portions of the surface of a side or skin, and gives uniformity of results with the different sides or skins that are operated upon.

In practice heretofore the operation of oiling-off has been performed after the putting-out operation, and after the sides or skins have been permitted to stand and cool off for a greater or less amount of time. Consequently the sides or skins are not in the best condition to receive the oil. Also, the oiling-off has been effected by hand by means of a hand-swab or brush which has been dipped in oil and passed over the surface of the side or skin. In thus proceeding it is frequently the case that the oil is not applied uniformly to the different portions of a side or skin, since the portion which first is touched by the freshly-charged swab or brush usually receives more oil than the portions over which the swab or brush passes later. It is difficult to secure substantially uniform results in the case of a number of sides or skins oiled-off by hand.

When the auxiliary roll 99 is employed as an oiling-off device, the adjusting devices employed in connection therewith are set to so limit the approach of such roll to the bed-roll as to prevent contact of their peripheries. Thereby direct transfer of oil from the absorbent jacket 99ª to the bed-roll is avoided. In order that an excessive amount of oil may not be squeezed out of the said jacket by contact with a side or skin extending between the oiling-device and the bed-roll, the adjustment preferably is such as to relieve the side or skin entirely from compression between the two rolls. In this case the side or skin, as it passes forward from between the bed-roll and feed-roll, will require to be held up in contact with the oiling-device. This may be effected by the workman as he grasps the forward portion of the side or skin and draws it toward him. Or it may be effected through the employment of a roll or rod 99ᵉ carried by the slides, on which the bed-roll is mounted. The said roll or rod is located in a somewhat elevated position on the said slides, in front of the working position of the oiling-off roll, in order that the portion of side or skin passing forward under the roll 99 and over the roll or rod 99ᵉ shall be held up by the latter against the under side of roll 99, thereby relieving the workman of the effort that would be involved in holding up a large side and keeping it drawn into proper contact with the periphery of the oiling-off roll. By drawing upon the side or skin with properly proportioned force as it extends forward over the roll 99ᵉ the workman graduates the tension of the side or skin to the extent to which it is desired the side or skin shall become charged with oil.

Inasmuch as rubber is affected injuriously by oil, I employ in the construction of the feed-roll other suitable material, such as brass, which is not affected by the acids used in tanning and remaining in the hides or skins to be treated, and will not discolor the latter, and I form the body of the bed-roll of disks or washers of felt, as shown in Figs. 1 and 2, strung upon a shaft and compressed together. To cause the disks or washers to turn in unison with the shaft, and prevent them from slipping or turning separately, they are keyed to the shaft in convenient manner, as, for instance, by making the shaft angular in cross-section, as shown by the cross-section of such shaft in Figs. 1 and 2. Any other plan of keying the disks or washers to the shaft may be adopted instead. Such oil as reaches the surface of the felt body of the bed-roll is absorbed thereby. The said felt body also absorbs the liquid that is squeezed out of the hide or skin so that such liquid is not taken up again by the hide or skin before the latter leaves the machine. When a rubber-covered bed-roll is employed, the liquid pressed out of the hide or skin and remaining on the bed-roll is again absorbed in whole or in part by the hide or skin, remaining in the latter. From time to time in the working of the machine, the latter is run without any hide or skin between the rolls, so that the pressure of one roll upon another may squeeze the excess of moisture out of the felt roll.

I claim as my invention:—

1. In a machine for treating hides, skins, or leather, the combination with the elements that act upon a hide, skin, or side, an operating crank, and devices for automatically communicating half-rotations to the said crank at the will of the operator and locking it in each of its opposite positions, of two rocking toothed members, one thereof operatively combined with the crank and actuated thereby and the other, when rocked, serving to transmit opening and closing movements to the said elements, and a third toothed member, intermediate the two rocking members, and transmitting motion from one to the other thereof.

2. In a machine for treating hides, skins, or leather, the combination with the elements that act upon a hide skin or side, of the actuating train comprising an operating crank, devices for automatically communicating half-rotations to the said crank at the will of the operator and locking it in each of its opposite positions, a rocking toothed member, operatively combined with the crank and actuated thereby and a second rocking toothed member which, when rocked, serves to transmit opening and closing movements to the said elements, a third toothed member intermediate the two rocking toothed members and transmitting motion from one to the other thereof, and a yielding member in the said train and through which the rocking member first mentioned is actuated adapted to compensate for variations in the thickness of material interposed between such elements.

3. In a machine for treating hides, skins, or leather, the combination with the elements that act upon a hide, skin or side, an operating crank, and devices for automatically communicating half-rotations to the said crank at the will of the operator and locking it in each of its opposite positions, of a rocking toothed member, a yielding connector between the said toothed member and the crank, a second rocking toothed member transmitting opening and closing movements to the said acting elements, and a toothed member intermediate the said rocking members and transmitting movement from one to the other thereof.

4. In a machine for treating hides, skins, or leather, the combination with elements for acting upon a hide, skin or side introduced into the machine, devices connected with the opposite ends of the said elements for closing the latter upon the said hide, skin or side, a fulcrum at each side of the machine for such devices, and a backing-up spring for each such fulcrum, of a compensating device between each fulcrum and its backing-up spring, operable at will to vary the closing action of the said elements at the corresponding side of the machine.

5. In a machine for treating hides, skins, or leather, the combination with elements for acting upon a hide, skin or side introduced into the machine, devices connected with the opposite ends of the said elements for closing the latter upon the said side or skin, a fulcrum at each side of the machine for such devices, and a backing-up spring for each such fulcrum, of a compensating toggle-connection between each fulcrum and its backing-up springs, and a manually-operated toggle-joint-breaking device.

6. The combination with a bed-roll, and a putting-out device coöperating therewith, of a device for embossing or graining the hide, skin or side as it is put-out.

7. The combination with putting-out mechanism, of a device for embossing or graining the hide, skin or side immediately following the putting-out operation.

8. The combination with a bed-roll, a putting-out device coöperating therewith, and an embossing or graining device which acts upon the hide, skin or side immediately following the putting-out operation.

9. The combination with a bed-roll, a putting-out roll coöperating therewith, and a feed-roll which also acts as an embossing and graining device.

10. The combination with a bed-roll, means for moving the same into and out of working position, and an auxiliary roll, of swinging carriers for said auxiliary roll, having cam-slots entered by the journals or boxes of the bed-roll, and operated by the movements of the latter back and forth, to swing the auxiliary roll into and out of working position.

11. The combination with a work-roll, a feed-roll, a bed-roll, means to close said bed-roll into working relations with the work-roll and feed-roll and open it therefrom, and an auxiliary roll, of swinging carriers for said auxiliary roll, having cam-slots entered by the journals or boxes of the bed-roll, and operated by the movements of the latter back and forth, to swing the auxiliary roll into and out of working position.

12. In a machine for treating hides, skins, and leather, the combination with a work-roll and its shaft, and a bed-roll, of means for closing said bed-roll into working relations with said work-roll, including an actuating shaft for such means, a driven shaft in driving connection with said actuating shaft, a loose wheel on said driven shaft, a manually-controlled clutch for coupling said wheel to said shaft, an intermediate shaft, large and small wheels fixed thereon, a small wheel on the work-roll shaft, an endless flexible driver passing around such wheel and the large wheel on the intermediate shaft, and a second endless flexible driver passing around the small wheel on the intermediate shaft and the loose wheel on the driven shaft.

13. The combination with the putting-out roll, and a bed-roll movable into and out of working relations with the putting-out roll, of an oiling-off device for oiling-off the freshly put-out side or skin, and means for moving the oiling-off roll into and out of working position as the bed-roll moves into and out of such relations with the putting-out roll.

In testimony whereof I affix my signature in presence of two witnesses.

DANIEL P. O'BRIEN.

Witnesses:
EDITH J. ANDERSON,
NATHAN B. DAY.

It is hereby certified that in Letters Patent No. 1,150,532, granted August 17, 1915, upon the application of Daniel P. O'Brien, of Woburn, Massachusetts, for an improvement in "Machines for Treating Hides, Skins, and Leather," an error appears in the printed specification requiring correction as follows: Page 9, line 27, claim 5, for the word "springs" read *spring;* and that the said Letters Patent should be read with this correction therein that the same may conform to the record of the case in the Patent Office.

Signed and sealed this 5th day of October, A. D., 1915.

[SEAL.]

R. F. WHITEHEAD,
*Acting Commissioner of Patents.*